June 10, 1969  H. SCHRODER  3,448,865
EQUIPMENT FOR MANUFACTURING BAKERY PRODUCTS
Filed Jan. 16, 1967
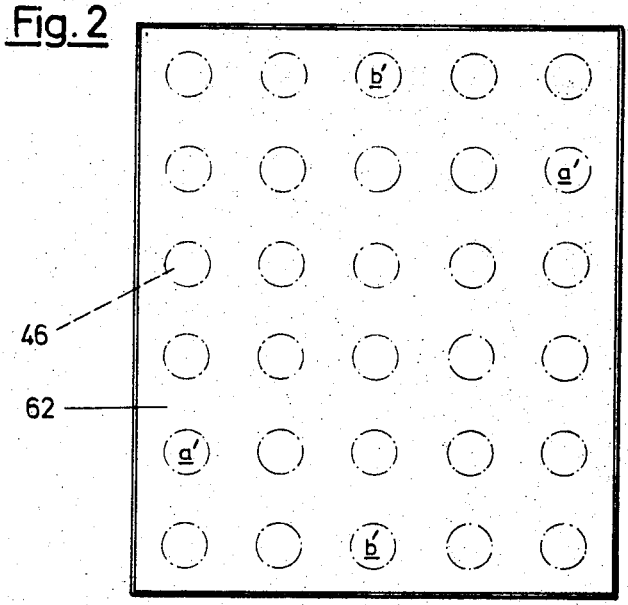
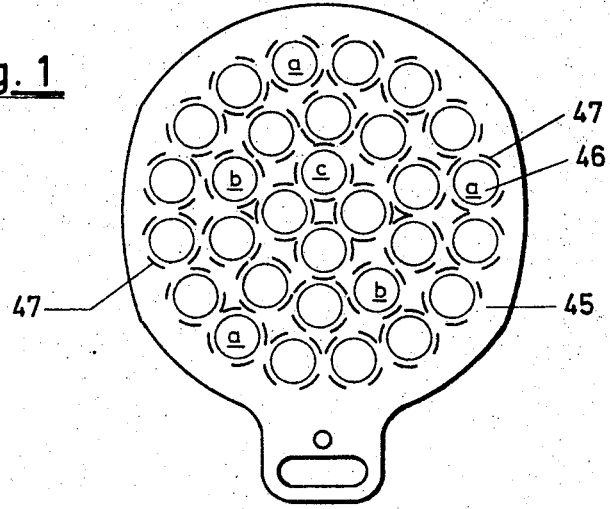

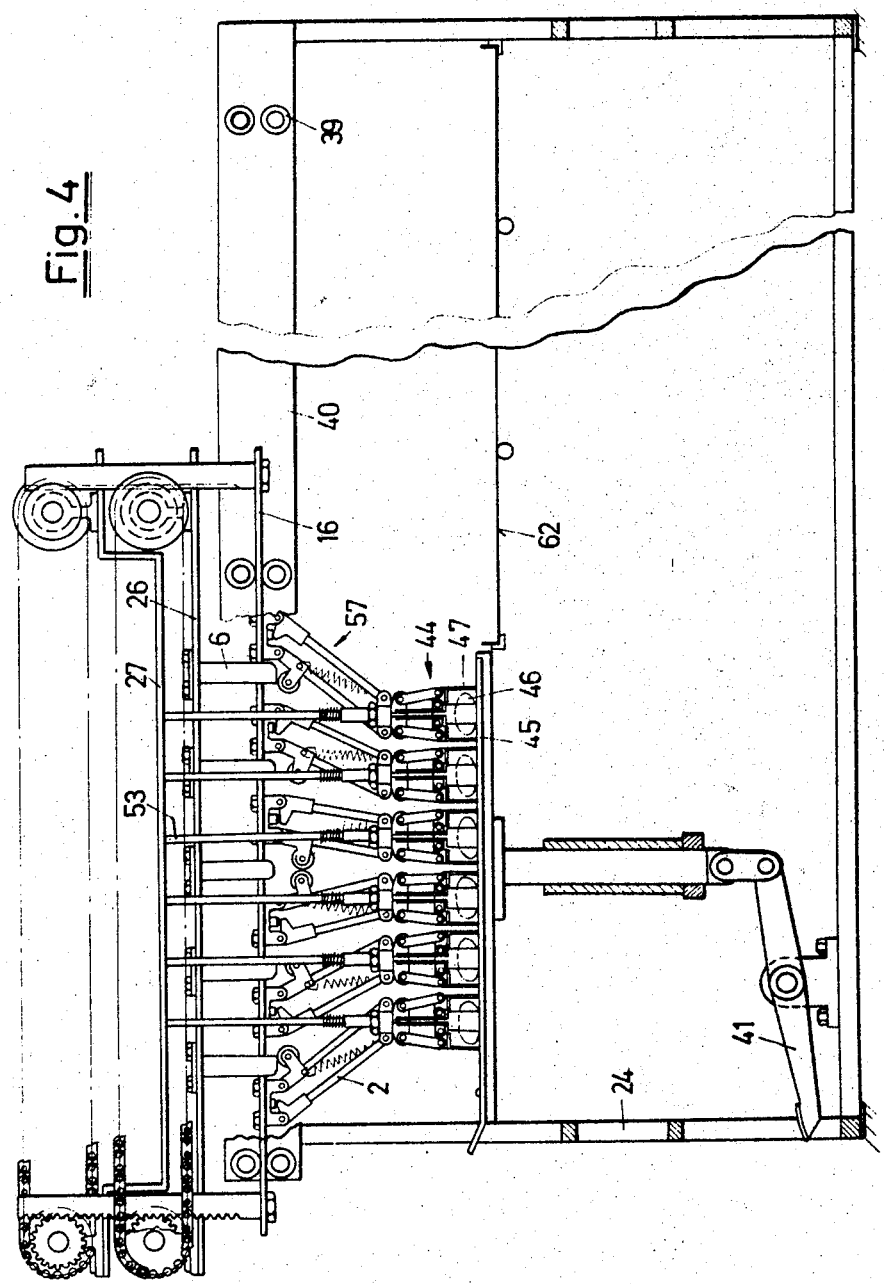

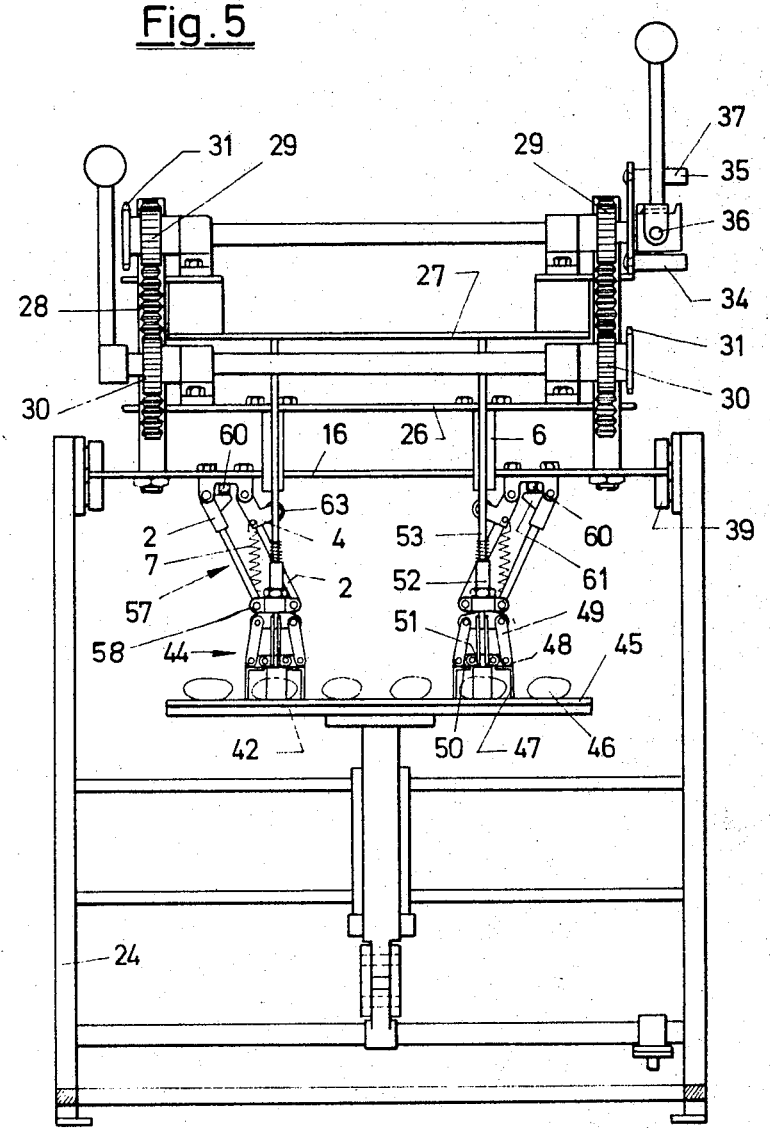

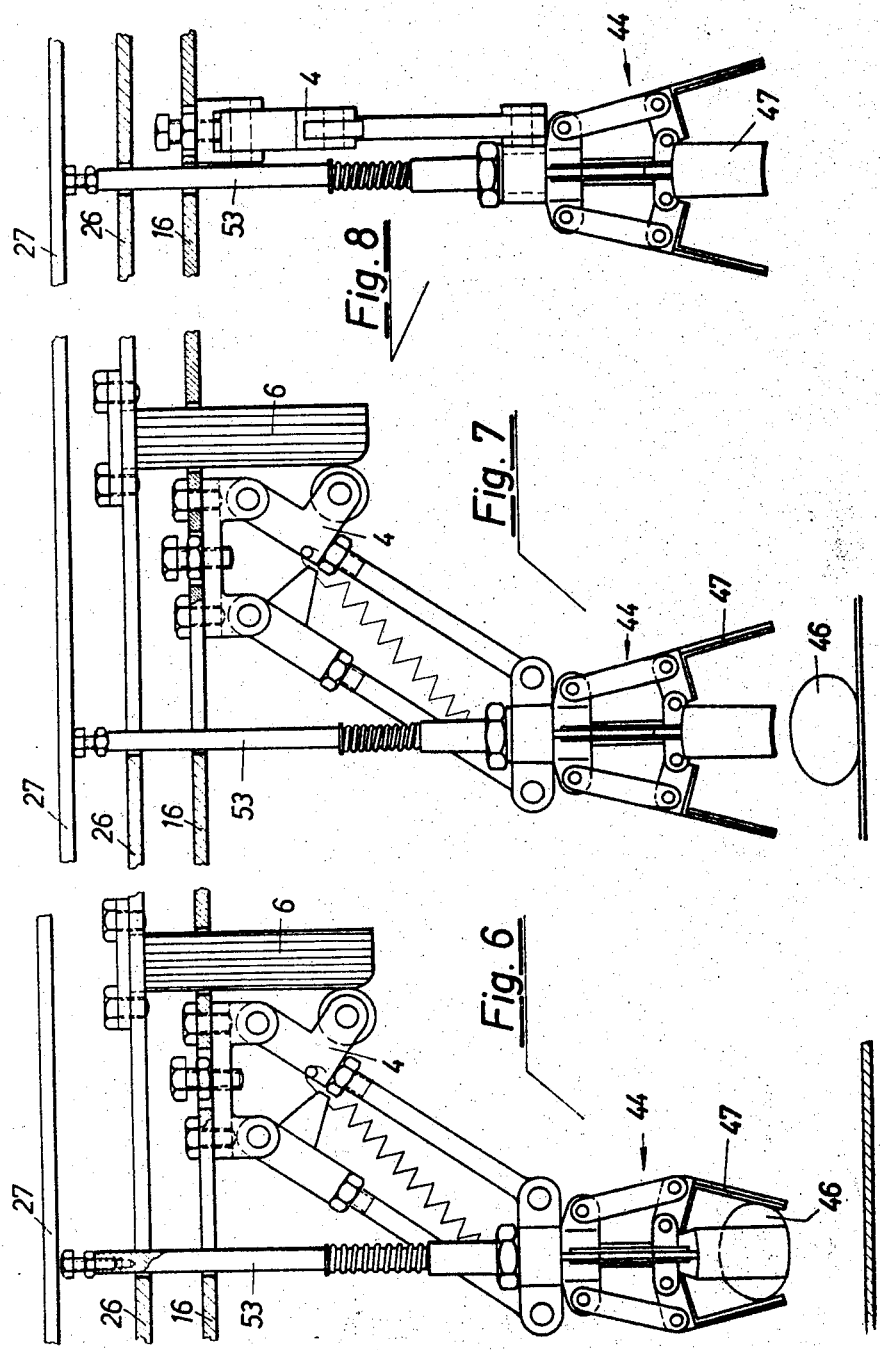

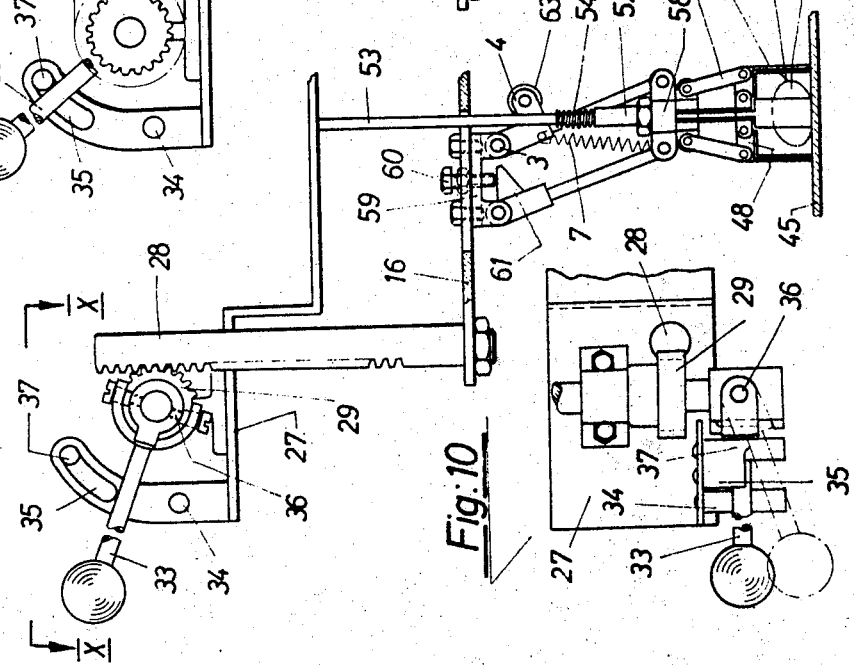

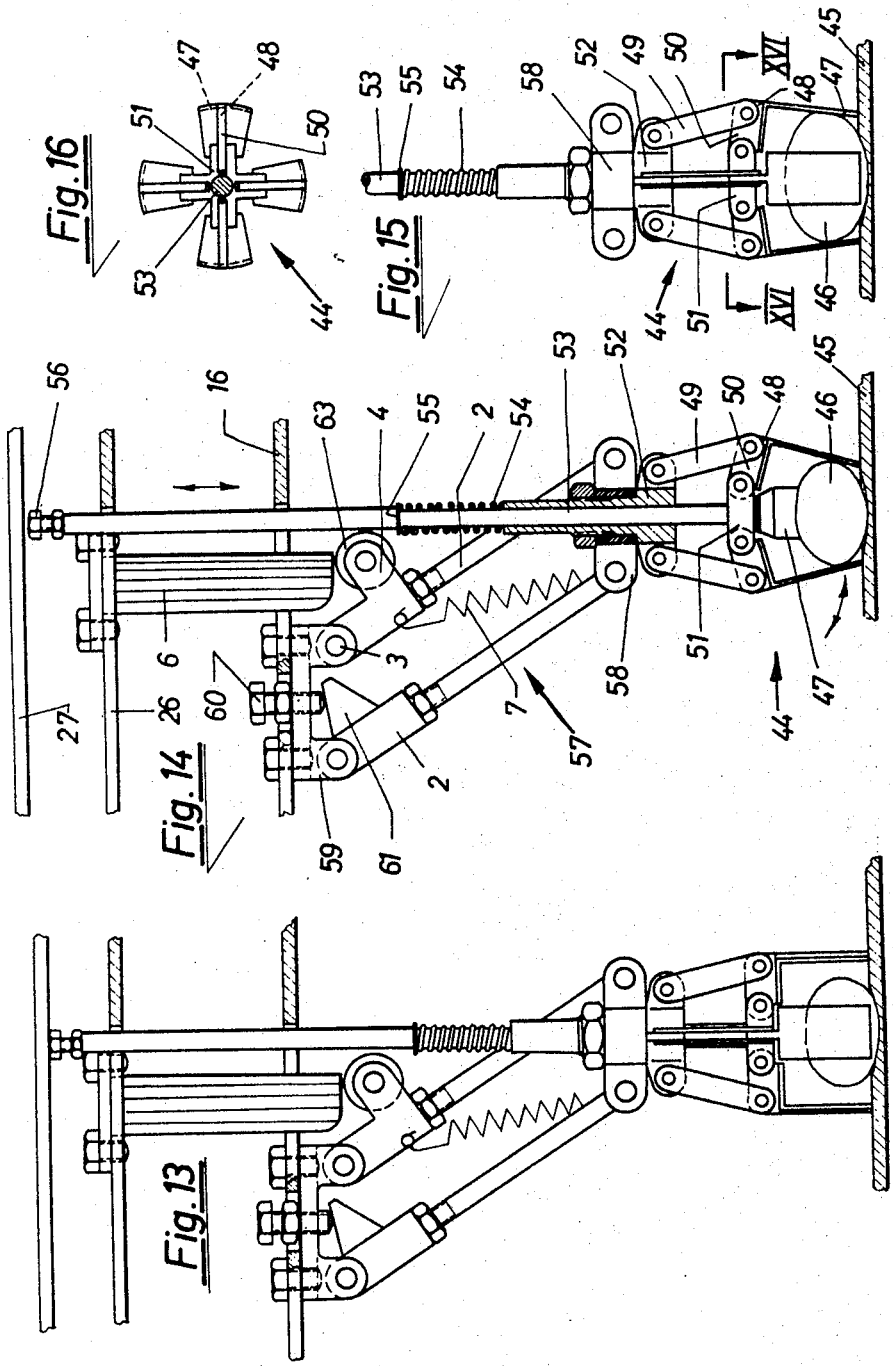

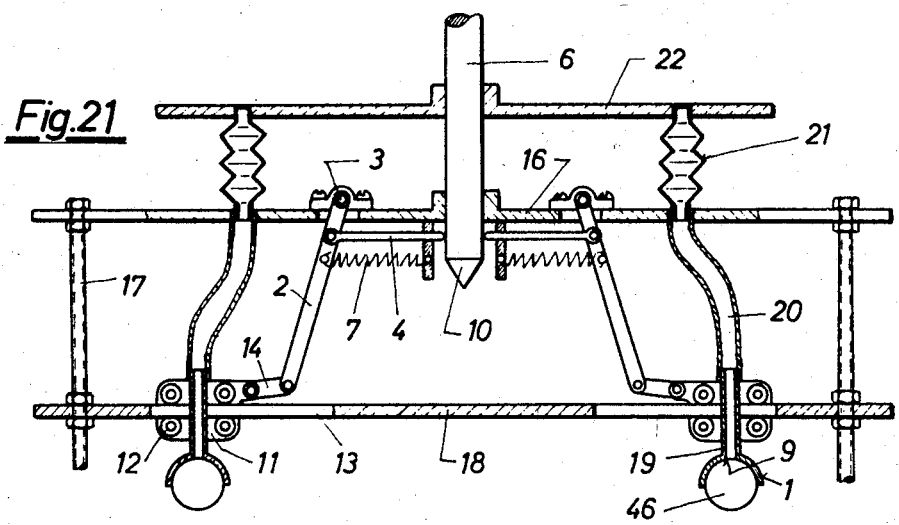
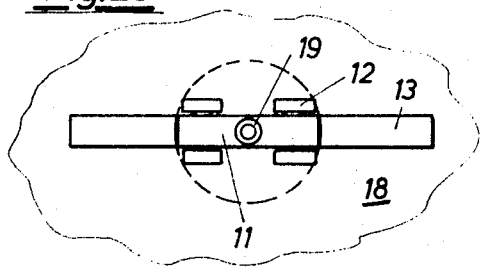
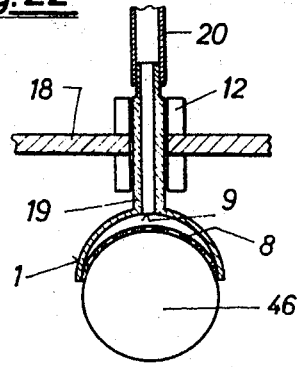

United States Patent Office 3,448,865
Patented June 10, 1969

3,448,865
EQUIPMENT FOR MANUFACTURING BAKERY PRODUCTS
Herbert Schroder, Angerstrasse, Staffelstein, Upper Franconia, Germany
Filed Jan. 16, 1967, Ser. No. 609,628
Claims priority, application Germany, May 14, 1966, Sch 38,990
Int. Cl. B25j 15/06, 3/00
U.S. Cl. 214—1                    14 Claims

ABSTRACT OF THE DISCLOSURE

An arrangement of holding devices disposed around a central point for taking hold of and depositing worked pieces of dough in batches, with each holding device being connected to its own guide means and movable over a given distance from the center point and back, and the movement of each holding device being effected by mechanical, pneumatic or hydraulic means.

---

Figure 3:
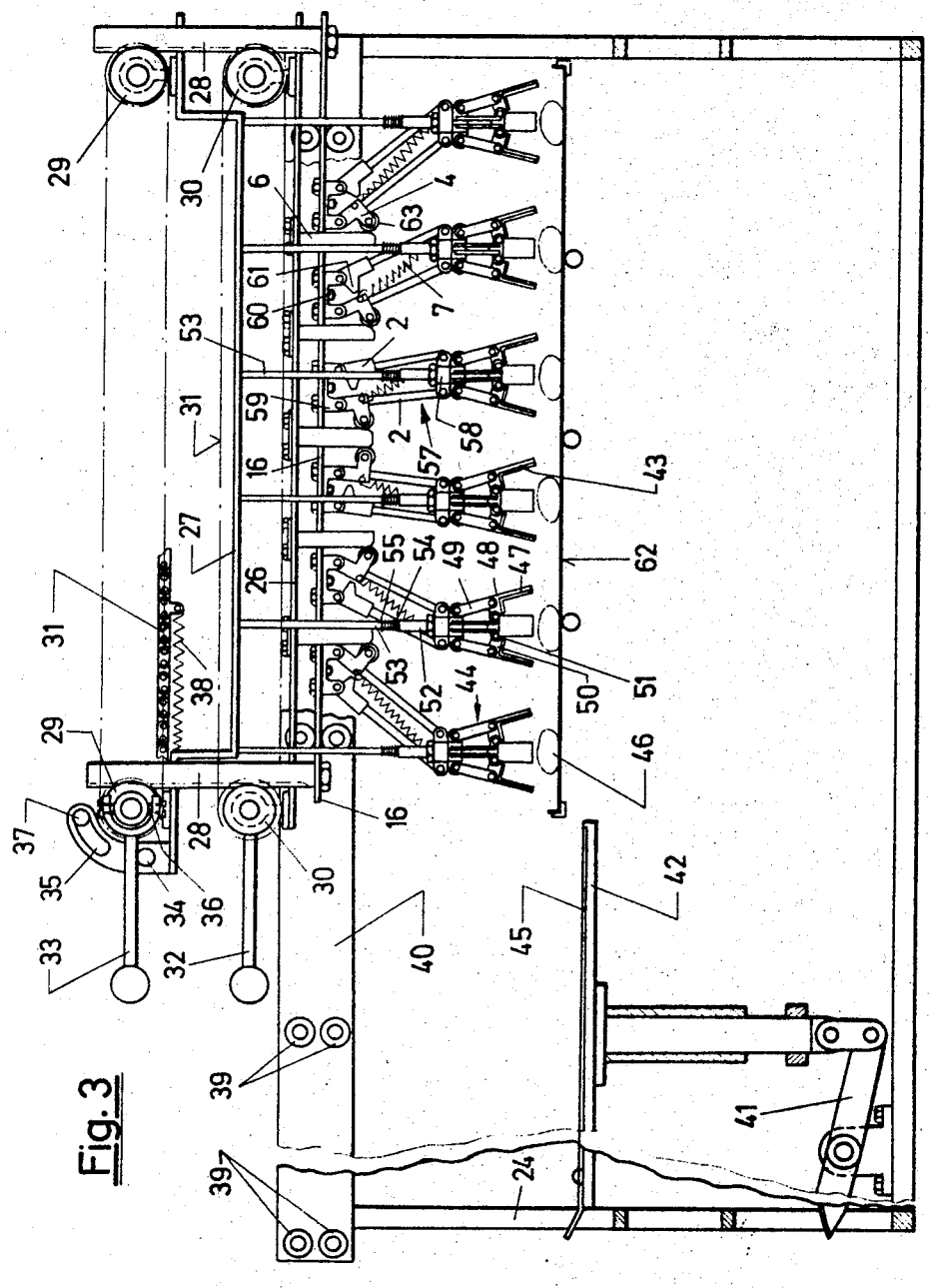

This invention relates to a device for taking hold of and depositing worked pieces of dough in batches, comprising gripping devices arranged around a central point.

Breakfast or Vienna rolls consist of worked pieces of dough, also known as molded articles. The dough pieces rest on a working plate, after they have been made or shaped, i.e. worked from a large lump of dough by means of a machine. The dough pieces are situated on the working plate in working formation, namely relatively close to one another and in a certain circular arrangement, for example in three concentric circles. The worked dough pieces swell, i.e. expand. In order that the dough pieces arranged relatively closely to one another on the working plate do not touch one another as they expand, the dough pieces must be spaced apart so that they have a greater distance from one another after the spacing. The expanded dough pieces are baked on a baking tray in an oven. On the baking tray the dough pieces are not only wider spaced than on the working plate but are also in a different formation. This other arrangement, called here the baking arrangement, is, for example, rectangular and in parallel rows. The worked pieces must therefore be spaced, rearranged and transferred from the working plate to the baking tray, which may also be a depositing plate for storing the dough pieces.

After the spacing or transfer, the dough pieces must rest on the baking tray with the same part of their surface with which they rest on the working plate and which is called the base. During spacing the sensitive outer skin of the dough pieces must not be damaged, for example crushed or split.

In a known device of said type known from German patent public inspection documents 1,076,053, the holding devices are arranged immovably with respect to one another and in such a way that their position corresponds to the working formation of the dough pieces. The holding devices of this arrangement are suction members which suck up the dough pieces and retain them by suction. Although the suction members of this known device transfer the dough pieces in one batch from the working plate to the baking tray, the pieces have on the baking tray the same relative arrangement as on the working plate. This is a disadvantage because the dough pieces have finally to be distributed on the baking tray by hand. The invention has as its object to effect the work of distributing, i.e. spacing and rearranging, mechanically.

The device according to the invention is characterised by the feature that each holding device is connected to its own guide means and is movable over a given distance from the center point and back by means of control means. In this device the holding devices take hold of the dough pieces, then they move apart and finally deposit the dough pieces.

In the device, the holding devices can move to and fro between two positions, called the working and baking positions. The working position of the holding devices corresponds to the working formation of the dough pieces and the baking position corresponds to the baking formation of the dough pieces.

If the dough pieces are gripped when in two or more concentric circles and are deposited in rows in one or more rectangles, one, two or more dough pieces must be moved from an inner circle to an outer rectangle, in order that all the dough pieces deposited in rectangles have approximately equal distances from one another. Because the holding devices would get in each others way if they were all to move simultaneously, the procedure according to the invention is that first the holding devices of the outer circle are moved simultaneously from the center point, then at least one holding device of the inner circle is moved away from the center point by a relatively great amount as far as those of the outer circle, and finally the rest of the inner circle are moved away from the center point by a relatively small amount. In order that in the present device two holding devices do not hinder one another in their movements, the arrangement is also characterised by the feature that two holding devices are movable with the beginning and end of their movements relatively staggered in time.

The movement of a holding device is brought about, for example by mechanical, pneumatic or hydraulic means. It is expedient in all cases if the holding device is moved by means of a control rod displaceable to and fro in the direction of its longitudinal axis, because this mechanical operation is less susceptible to breakdown. If each holding device is connected with a guide lever capable of swinging about a bearing point and if a control stop arranged on the guide lever is moved by means of the control rod, the present device has a mechanical system for moving the holding devices which is similar to the mechanics of an umbrella. The ends of the ribs of the umbrella are comparable with the holding devices, the umbrella ring displaceable on the stick with the control rod, and the stretchers between ring and ribs with the control stop between holding device and control rod. The movement of the holding devices on actuation of the control rod is also comparable with the movement of the ends of the ribs on actuation of the ring.

Furthermore, it is advantageous if the holding devices are moved parallel to themselves, because the dough pieces are then gripped and deposited in the same position, i.e. with their base downwards. For the purpose of parallel displaceability, each holding device in the embodiment of the arrangement described above is pivotally connected with its guide lever. Furthermore, the arrangement is such that one guide means has two parallel guide levers supporting the holding device and articulated to an upper parallelogram cross bar and the latter is detachably fixed to a support plate. Each holding device can therefore be detached from the support plate in a simple manner.

In the arrangement known from German patent public inspection documents 1,076,153 the suction bores of all the suction members open into an air-tight casing, which is connected by way of a pipe to a pressure generator for negative and excess pressure. If a single piece of dough does not close the suction bore of its suction device tightly, then the pressure generator only sucks up at this suction device and is ineffective on the remaining suction members. There is therefore the danger that in the event of a sucked up dough piece becoming detached, the others will likewise become detached. The corresponding difficulty exists on depositing, because dough pieces remaining stuck to their suction device can no longer be detached by excess pressure, because the excess pressure has escaped through suction devices whose dough pieces have already been ejected. The invention also has as its object to avoid these disadvantages.

To this end the invention consists further in that each holding device has a suction device and each suction device is connected to its own pressure generator for negative and excess pressure. Then each suction device works independently from the others. A simply way of providing a separate pressure generator for each suction device and of actuating several pressure generators jointly exists if the pressure generators are bellow-like hollow members, which are arranged between a stationary pressure plate and a pressure plate parallel with the stationary pressure plate and movable perpendicularly thereto. In order to avoid that too great a suction force acts at one point on a dough piece gripped by a suction device, it is advisable if the suction devices have in each case a semi-spherical cup with a suction bore and in each semi-spherical cup a cup-shaped screen is provided. The suction force of the pressure generator is then distributed over the plurality of screen apertures in the cup-shaped screen.

There are dough pieces, those for so-called cut rolls for example, which are not smooth on their upper surface but have a deep cut or several deep cuts. These dough pieces cannot be sucked up, that is to say cannot be transferred and distributed by means of an arrangement comprising a suction device. The invention also has as its object to provide an arrangement which does not comprise suction devices, i.e. to provide a holding device working on a new principle.

The device according to the invention is for this purpose further characterised by the feature that it comprises as holding device a gripper arrangement having at least two claws arranged at a distance from one another and movable relatively to one another. The gripper arrangement works on the principle of the human hand and the claws constitute the fingers of the hand. It is surprising that in the present case a device working on the natural principle of taking hold of something is superior to a principle of taking hold which differs from the natural.

The claws of a gripper arrangement preferably hold a dough piece not only by clamping pressure, but also by the fact that they reach under the dough piece at least to some extent. The movement and operation of the claws is simple. If each claw of a gripper arrangement is connected to one arm, the claw arm, of an angle lever rotatable about its bend, and the other arm of which, the operating arm, can be pivoted by a claw rod mounted so as to be displaceable in its longitidinal direction. By longitudinal displacement of the claw rod the free ends of the claws are pivoted.

The claws of a gripper arrangement can be brought into three positions which will be described separately. In one position, called the closing position, the free ends of the claws are brought very close to one another so that the claws can hold a dough piece. In the second position, called the picking up position, the claws all spread in the same direction and parallel with one another. A dough piece is adapted to be inserted between the claws of a gripper arrangement in the picking up position. In the third position, called the spread position, the free ends of the claws are further from one another than in the picking up position.

The risk of a dough piece remaining stuck to the claws is fully avoided if the claws have a coating constituting their contact surface. Common operation of several gripper arrangements is brought about by providing a reciprocating claw-actuating plate acting on the claw rods of several gripper arrangements. This claw-actuating plate is preferably arranged on the side of the support plate remote from the gripper arrangements and parallel with the support plate, with the latter being provided with slots for the passage of the claw rods and the size and direction of the slots corresponding substantially to the movements of the gripper arrangements parallel with the support plate. If the claws are urged into their closing position by a claw-closing spring and the gripper arrangements are moved into the working plate position by a return spring, it is preferable for the force of the return spring pulling the gripper arrangement into its working plate position to overcome the force of the claw-closing spring. This is because then the return spring can pull the gripper arrangement into its working plate position in spite of the claw-closing spring.

Figure 17:
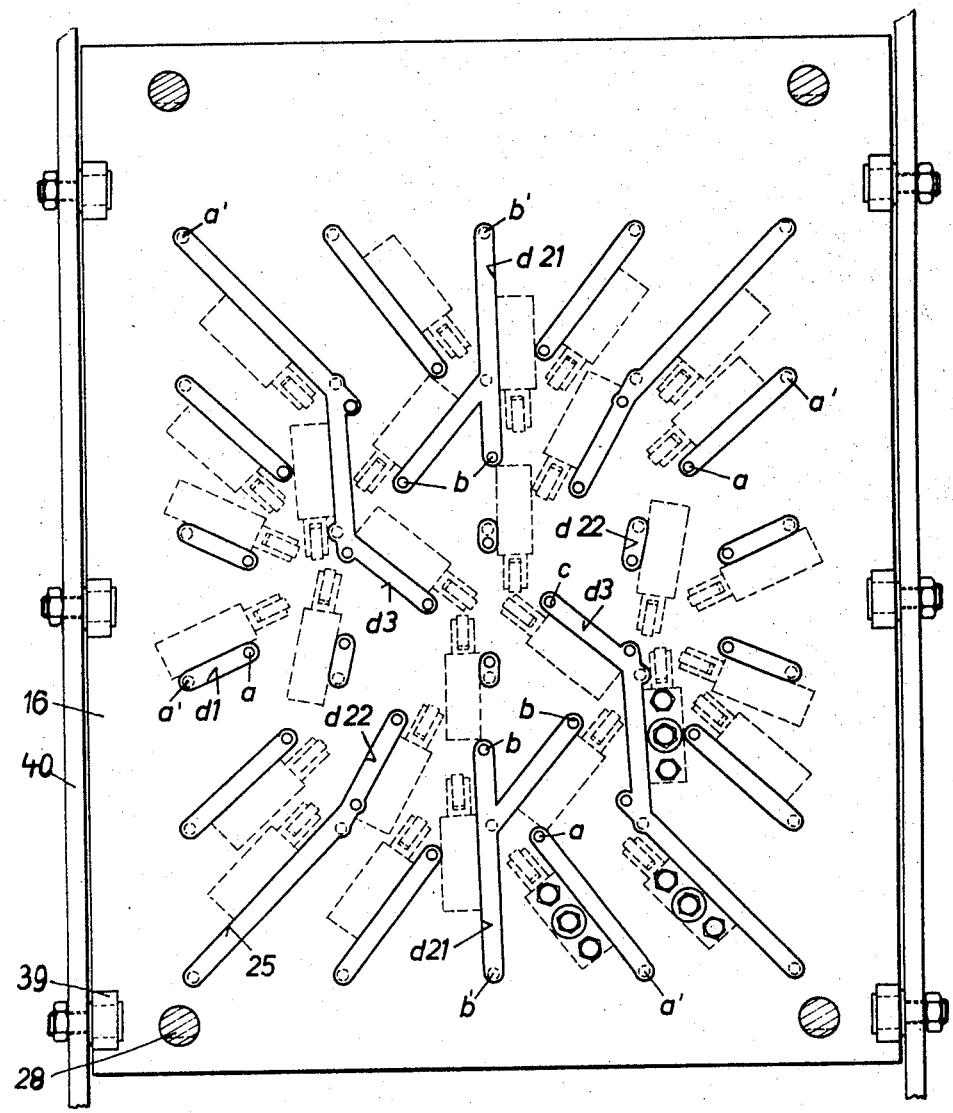
Figure 18:
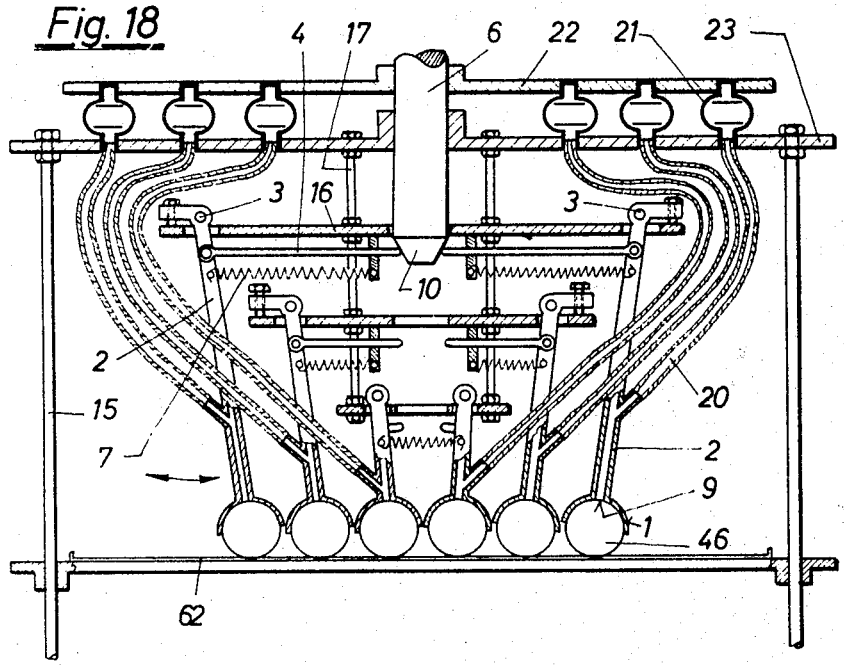
Figure 19:
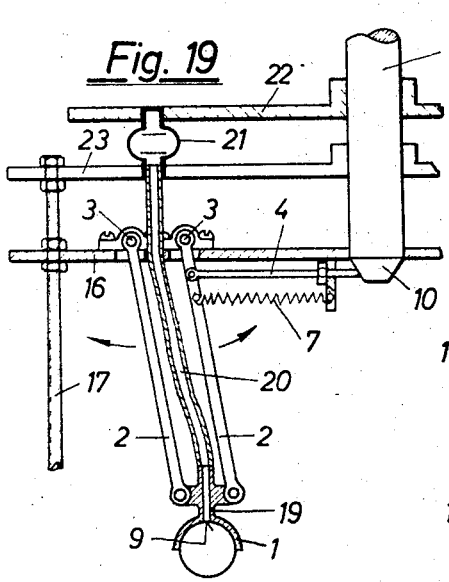
Figure 20:
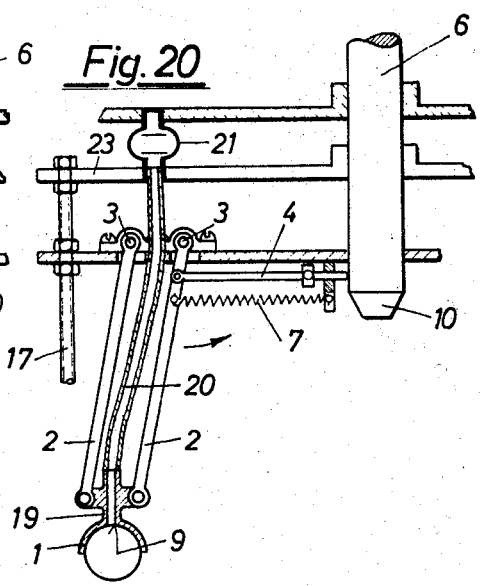
Figure 24:
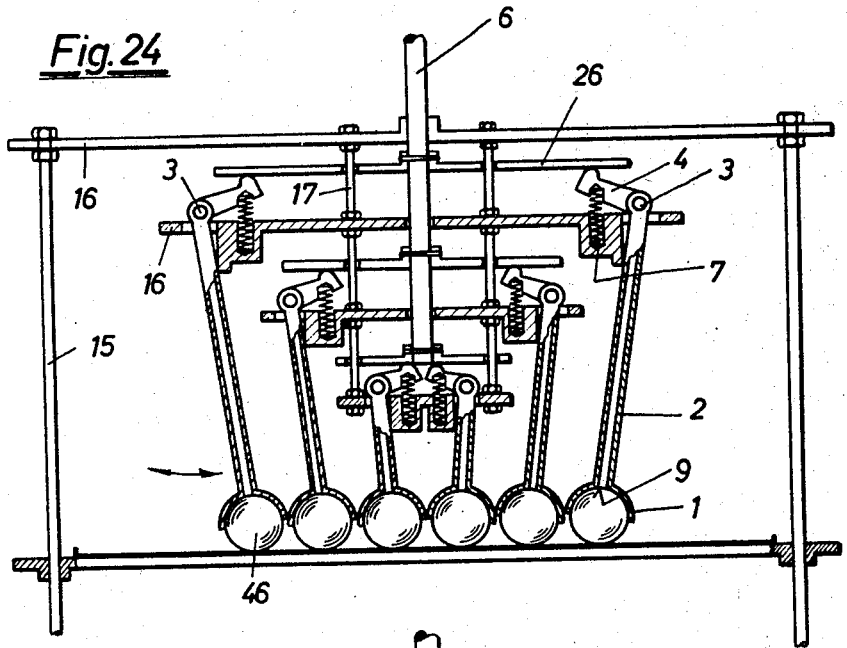
Figure 25:
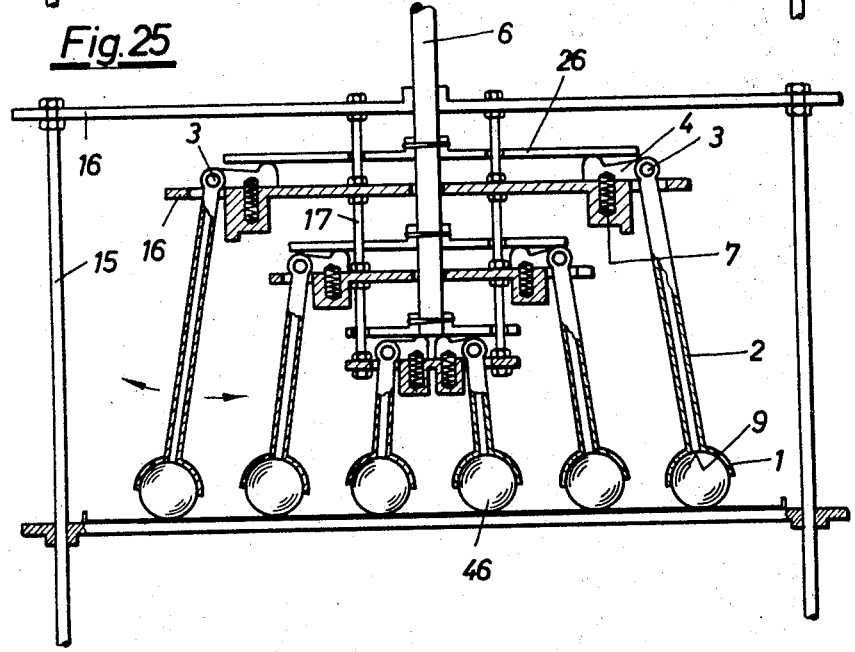

Various embodiments of the invention will be described in detail hereunder with reference to the accompanying drawings, in which:

FIGURE 1 shows a working plate with dough pieces.
FIGURE 2 shows a baking tray with dough pieces.
FIGURE 3 shows a preferred embodiment of a device in side view with parts broken away.
FIGURE 4 shows the preferred embodiment according to FIGURE 3 with holding devices brought into a different position from FIGURE 3.
FIGURE 5 shows the preferred embodiment according to FIGURES 3 and 5 in front view.
FIGURE 6 shows a gripper arrangement in baking position with claws in the closing position.
FIGURE 7 shows the gripper arrangement according to FIGURE 6 in baking position with claws in the spread position.
FIGURE 8 shows another view of what is shown in FIGURE 7.
FIGURE 9 shows a claw-actuating lever and claws in the picking up position.
FIGURE 10 is a view along the line X—X of FIGURE 9.
FIGURE 11 shows the claw-actuating lever and the claws according to FIGURE 9 in the closing position.
FIGURE 12 shows the claw-actuating lever and the claws according to FIGURE 9 in the spread position.
FIGURE 13 shows the gripper arrangement according to FIGURE 6 in the working plate position with claws in the picking up position.
FIGURE 14 shows the gripper arrangement according to FIGURE 6 in the working plate position with claws in the closing position.
FIGURE 15 shows a gripper arrangement.
FIGURE 16 is a section along the line XVI—XVI of FIGURE 15.
FIGURE 17 shows an arrangement of gripper devices on a support plate and the course of the slots for the claw rods located in the carrier plate, applicable to the preferred embodiment according to FIGURES 3 to 5.
FIGURE 18 shows a part of one embodiment with suction devices and pressure generators, partly in section.
FIGURE 19 shows a suction device on parallel guide levers in the working plate position.
FIGURE 20 shows the suction device according to FIGURE 19 in the baking position.
FIGURE 21 shows a part of another embodiment with suction devices and pressure generators.
FIGURE 22 shows a suction device on a larger scale than in FIGURE 21 and in section.
FIGURE 23 shows a detail of FIGURE 21 on a larger scale then in FIGURE 21.
FIGURE 24 shows a part of a third embodiment with pressure generators and suction devices in the working plate position.
FIGURE 25 shows the embodiment according to FIGURE 24 with the suction devices in the baking position.

For dough pieces 46 which are to be spaced apart from a circular working formation on a working plate 45 into a rectangular baking formation in rows on a baking tray 62, there is provided in the preferred embodiment of the device a method of moving the holding devices wherein the holding devices do not obstruct one another. This manner of movement will be described for thirty dough pieces 46 with reference to FIGURES 1, 2 and 17.

On the working plate 45 are thirty dough pieces represented by small circles in solid outline and arranged in an outer circle of sixteen pieces a, a middle circle of ten pieces b and an inner circle of four pieces c. In order to arrange these thirty dough pieces rectangularly on the baking tray 62, first the pieces a of the outer circle are moved outwards far enough to define an outer rectangle of dough pieces a' represented by small dotted circles. The outer rectangle needs six dough pieces at each longitudinal side including corners and three at each horizontal side, that is to say eighteen dough pieces altogether. Because the outer circle only supplies sixteen dough pieces a', two pieces b' must be brought into the outer rectangle from the middle circle. As straight lines representing the path of the dough pieces or the devices holding them show in FIGURE 17, the holding devices may obstruct one another if they are all moved simultaneously. Therefore, after the dough pieces a of the outer circle have been brought into the outer rectangle in a first step d1, two dough pieces b are brought from the middle circle into the outer rectangle in a second step d21. Then in a third step d22 the remaining pieces b of the middle circle are brought into a middle rectangle. In a fourth step d3 two dough pieces c of the inner circle are brought into the inner rectangle and the remaining two pieces of the inner circle are moved into alignment.

The preferred embodiment of the device has as holding devices gripper arrangements 44. Each gripper arrangement 44 has, as shown for example in FIGURES 15 and 16, four elongated, rectangular claws 47 curved in the manner of cylinder jacket sections, and each two of which are arranged facing one another and are movable relatively to one another. The two pairs of claws 47 are movable in directions perpendicular to one another. A greater or smaller number of claws may be advisable according to the type of dough or size of dough pieces. Each claw 47 forms one arm, the claw arm, of an angle lever, which is rotatably fixed at its bend 48 to one end of a bar 49. The other arms, actuating arms 50 of the angle levers of a gripper arrangement 44, extending at right angles to the claw arms, point towards one another and are each articulated to one arm of a star-piece 51. The other ends of the four bars 49 of a gripper arrangement 44 are fixed to a common tubular member 52. A claw rod 53 attached to the star-piece 51 projects through the tubular member 52 and is displaceable in the latter in the direction of its longitudinal axis. A claw-closing spring 54 designed as a compression spring is placed over the claw rod 53 and bears at one end on the claw rod by way of an abutment ring 55 adjustable in the direction of the longitudinal axis of the claw rod and at the other end on the tubular member 52. The length of each claw rod 53 is exactly adjustable by means of a setscrew 56 shown in FIGURE 14.

Essential to the gripper arrangement 44 in this embodiment is the feature that the claws 47 are urged into their closing position by the claw-closing spring 54. To this end, the claw-closing spring 54 urges the claw rod 53 in the direction of its longitudinal axis away from the claws 47, and at the same time pulls the star-piece 51 away from the claws, pivots the actuating arm towards the tubular member 52 and moves the free ends of the claws towards one another. If the claw rod 53 is pressed on to the claws 47, the claws are pried apart and the dough piece 46 can fall out. Should it stick to the claws 47, it is pushed off by the star-piece 51 of the claws. Sticking is also prevented by a coating 43 forming the contact surface of a claw 47, as shown for example in FIGURE 3.

Each gripper arrangement 44 is, as shown for example in FIGURE 14, fixed by way of its own guide means 57 to the underside of a horizontally arranged support plate 16. Each guide means 57 has a lower parallelogram cross-bar 58, which by means of a bore is pushed over the claw rod 53, the abutment ring 55 and the claw-closing spring 54 on to the tubular member 52. The gripper arrangement 44 is retained on the lower parallelogram cross-bar and hence on the guide means 57 by means of a nut screwed above the bar on to the tubular member 52. For repair purposes the nut is loosened and the gripper arrangement 44 is withdrawn through the bore in the lower parallelogram cross-bar 58.

The design of the device is therefore such that each gripper arrangement 44 with a part carrying the claws 47 is pushed through a bore in a cross-bar in the guide means in an axially rotatable manner. Each gripper arrangement 44 can thus also be rotated about the axis of its claw rod 53 and hence adjusted and set as desired. This is of advantage because the gripper arrangements 44 should be together so adjusted that only one claw 47 projects between each two adjacent dough pieces 46 on the working plate 45. That is to say the space between two adjacent dough pieces 46 is small. An advantageous formation of the gripper arrangements 44 and the claws 47 is shown in FIGURE 1. For the sake of simplicity, the remaining figures disregard this point.

A guide lever 2, consisting of two parts screwed into one another so as to be adjustable in length, is articulated to each end of each lower parallelogram cross-bar 58. The free ends of the two parallel guide levers 2 are articulated to an upper parallelogram cross-bar 59, which is screwed to the underside of the support plate 16. Each gripper arrangement 44 can together with its guide means 57 be removed from the support plate 16 and thus from the whole device, by unscrewing of its upper parallelogram cross-bar 59. A return spring 7, extending diagonally between the upper and lower parallelogram cross-bars and fixed to the guide levers 2, is designed as a tension spring and pulls the gripper arrangement 44 into the working plate position. The device is thus so designed that the movement of a holding device in one direction takes place at least partly against the force of a return spring and the movement in the opposite direction takes place correspondingly partly through the force of the return spring. The working plate position of the gripper arrangement 44 is set by a set-screw 60 for the working plate position, which is screwed through the upper parallelogram cross-bar 59, is adjustable and abuts against a stop for the working position fixed to a guide lever 2. The adjusting of the working position can thus advantageously be carried out from outside the whole device.

The device comprises a control means, by means of which the holding devices can be moved from the working position into the baking position and back into the working position. To this end, a control stop 4 carrying a ball-bearing stop roller 63 is in the preferred embodiment, as shown for example, in FIGURE 14, rigidly fixed to one of the two guide levers 2. The control stop extends at right angles to the guide lever 2 and is located near the upper parallelogram cross-bar 59. It co-operates with a control rod 6 movable up and down in the direction of its longitudinal axis, which is associated with each gripper arrangement 44. The control stop 4 touches the control rod 6 during the movement of the holding device, so that the movement of the latter is always controlled. In order that the gripper arrangements 44 do not interfere with one another, when they are brought from the working position into the baking position, the beginning of the movement of the outer ones precedes that of the inner ones. As shown in FIGURE 4, this is achieved by the fact that the distance between the end of the control rod 6 and the control stops 4 or stop rollers 63 varies when the gripper arrangements 44 are in their working position. The distance varies if the control rods 6 are of different lengths. Because the guide levers 2 of the outer gripper arrangements 44 are pivoted through a greater angle to the vertical than the guide levers of the inner gripper arrangements, the control stops 4 of the outer gripper arrangements are pivoted further towards their control rods 6 than those of the inner gripper arrangements.

As shown in FIGURE 14, the control rods project in each case through an opening in the support plate 16 and are screwed to a control plate 26, which runs above and parallel with the support plate. If the control plate 26 and hence the control rod 6 is moved towards the claws 47, the control rod causes, through the control stop 4, the guide lever 2 of the latter to pivot against the force of the return spring 7 and brings the gripper arrangement 44 into the baking position. During this operation, the direction in which the claw rod 53 extends does not alter. With increasing distance of a control rod 6 from the upper parallelogram cross-bar 59, the guide levers 2 are pivoted through a decreasing angle.

The guide levers of each gripper arrangement are, in the baking and in the working position, pivoted through the same angle to the vertical in opposite directions. In order that the claws of all the gripper arrangements are at the same height in the working position, the guide levers of the various gripper arrangements are of different lengths. If the return spring expediently extends diagonally, the gripper arrangements are also all at the same height in the baking position and the distribution and fixing of the upper parallelogram cross-bars to the support plate presents fewer difficulties.

As shown in FIGURES 3 and 5, for example, the claw rods 53 project through the support plate 16 and the control plate 26 and are guided therein in slots 25, shown in FIGURE 17 in more detail, which correspond to the movements of their gripper arrangements 44. They terminate both in the working and baking position, at the same height for all the gripper arrangements, at a greater or lesser distance from a claw-actuating plate 27, which runs above and parallel with the control plate 26.

In the embodiments of the guide means according to FIGURES 18, 24 and 25 suction devices 1 are rigidly connected to the guide levers 2, so that when a guide lever pivots, the suction device also pivots. In the embodiments according to FIGURES 19 to 21, however, the suction devices 1 are likewise displaced parallel to themselves. For this purpose, in the embodiment shown in FIGURES 19 and 20 the suction device 1 is pivotally connected to two parallel guide levers 2, which in turn are adapted to pivot about bearing points 3 on a support plate 16. Now, if a guide lever 2 is caused to pivot through its control stop 4, the suction device, on account of the parallel guiding provided by the two guide levers 2, is moved only parallel with itself, in two directions perpendicular to one another. In the embodiment shown in FIGURE 21, the suction device 1 is advantageously only displaced in one direction, because it is here rigidly connected to a carriage 11, which runs by means of eight wheels 12 on a carriage-carrying plate 18, with a feed pipe to the suction device 1 being guided in a slot 13 in the carriage-guiding plate. To the carriage 11 is articulated an intermediate level 15 which is in turn articulated to the guide lever 2.

In the embodiment of the control means according to FIGURES 24 and 25, the control stop 4 and the guide lever 2 are in each case rigidly connected to one another so as to pivot jointly about the bearing point 3 and are approximately at right angles to one another. Several control plates 26 arranged perpendicularly to the control rod 6 are rigidly connected to the control rod and rest in each case on the free ends of a plurality of control stops 4. If the control rod 6 with the control plates 26 is moved downwards, the free ends of the control stops 4 are pressed downwards until they strike an abutment. In so doing each control stop 4 and its guide lever 2 pivots and a return spring 7 arranged between support plate 16 and control stop 4 is put under tension for each guide lever.

In the embodiment of the control means according to FIGURES 18 to 21, the control rod 6 has an approximately constant cross-section over its entire length and a tapering rod piece 10 at one end. The control stop 4 articulated to the guide lever 2 touches the cylindrical surface of the control rod 6 and is arranged approximately at right angles to the control rod. If the control rod 6 is raised, it does not touch the control stop 4 or touches it only at its tapering rod piece 10. If it is pushed downwards, it forces the control stop 4 to the side owing to its tapering rod piece 10. The control stop 4 is connected to the guide lever 2 by a link, with the link being at a distance from the bearing point 3, so that the guide lever 2 is pivoted by the movement of the control stop 4. In this embodiment, the extent by which the holding device is moved is determined by the change in diameter of the tapering rod piece 10 of the control rod 6. The return spring 7 is a tension spring and is connected to the guide lever 6 and an abutment.

Moving the individual holding devices in succession is achieved in the last-mentioned embodiment by the feature that, as shown in FIGURE 18, there is one group of control stops at one height and several groups arranged above one another. In FIGURE 18, groups A, B and C each of two control stops 4 are arranged one above the other and are actuated one after the other on downward movement of the control rod 6. For the diagram in FIGURE 17 a device with four difference groups of control stops 4 is necessary, with these either being arranged above one another or preferably terminating at differing distances from the control rod 6.

In another suitable embodiment of a gripper arrangement, not shown, the claws are moved by means of a Bowden cable. In this case, for example, the claw rod is connected to the core of the cable or is formed by the core, with the sheath of the Bowden cable constituting a continuation of the tubular member and at the end of the cable remote from the claws the claw-closing spring bears on the core at one end and on the sheath at the other. The cores and sheaths of all the gripper arrangements are combined into one general core and sheath at the ends remote from the claws.

In the embodiment using suction devices as holding devices, according to FIGURES 18 to 21, the suction devices 1 form hollow half-spheres with a suction bore 9 at the center of the spherical cup. Starting from the suction bore 9, each suction device 1 is connected to a hollow connection 19, and to the other end of which is connected a flexible pipe 20. The pipe 20 is connected to an opening of a bellows-like hollow member 21 acting as pressure generator, which is arranged between the fixed support plate 16 or a separate stationary pressure plate 23 and a pressure plate 22 displaceable above the first plate, with one opening in the bellows 21 leading into a bore in the support plate 16. In the embodiment in FIGURE 18 the bellows member 21 is formed spherically, while in the embodiment in FIGURE 21 is accordion-shaped.

If the displaceable pressure plate 22 is moved up and down, the bellows member 21 is alternatively compressed and expanded, on the one hand the air therein or in the pipes 20 being blown out through the suction bore 9 in the suction device 1, or on the other hand air being sucked in through the suction bore. If the suction bore 9 is closed by a dough piece 46, negative pressure is produced in the bellows member 21 and in the pipe 20 and holds the dough piece.

If a dough piece 46 is sucked up directly by the suction bore 9, there is the danger that dough will penetrate the suction bore, the dough piece will be deformed or the surface skin of the dough piece will be damaged. This is all avoided if, as shown in FIGURE 22, a cup-shaped screen 8 with screen apertures is provided in the spherical cups at a distance from the base. The dough piece 46 is then not sucked up strongly on a suction bore, but weakly on a plurality of screen openings.

For moving the holding devices and actuating the gripper arrangements a design is provided, in which a plate is movable by means of a toothed wheel engaging in a toothed rack, a lever being rigidly fixed to the wheel. In the preferred embodiment, the horizontally arranged control plate 26 and the claw-actuating plate 27 are guided so as to be able to move up and down on four vertical toothed racks 28, which are fixed in the four corners of the support plate 16 at right angles to the latter. Each two facing toothed racks 28 have their teeth towards the same side. One of four toothed wheels 29 rotatably attached to the claw actuating plate 27 and one of four toothed wheels 30 rotatably attached to the control plate 26 engage in each of the toothed racks 28. Two toothed wheels of each plate are connected to one another by an endless chain 31. When the toothed wheels 29, 30 roll on the toothed racks 28, the control plate 26 and the claw-actuating plate 27 move up and down. The sides of the toothed racks 28 remote from the teeth slide on the claw-actuating plate 27 and the control plate 26.

A control lever 32 is rigidly fixed to one of the toothed wheels 29 arranged on the control plate 26. A claw-actuating lever 33 is rigidly fixed to one of the toothed wheels 30 arranged on the claw-actuating plate 27. If the control lever 32 is swung downwards into a horizontal position, the control rods 6 move downwards and the gripper arrangements 44 pass into the baking position shown in FIGURE 3. If it is swung upwards, they pass into the working position shown in FIGURE 5. If the claw-actuating lever 33 is swung downwards into a horizontal position, the claw rods 53 are urged downwards, and the gripper arrangements 44 pass into their spread position shown in FIGURE 3. If it is swung upwards, the claws 47 pass into the picking up postion shown in FIGURE 5 or the closing position shown in FIGURE 15. In the spread position the claw-actuating lever 33 rests on a cam 34 for the spread position. If it is swung upwards, it comes to bear on a cam 35 for the picking up position. At this time the claws 47 are in the picking up position shown in FIGURE 5, in which they extend substantially perpendicularly to the working plate 45, are moved over the dough pieces 46 for the purpose of picking up, and extend parallel with one another. The claw-actuating lever 33 is adapted to pivot about a fulcrum 36 extending at right angles to the shaft of its toothed wheel 30 and by swinging about this fulcrum can be withdrawn from the influence of the cam 35 for the picking up position. If it is swung out about the shaft of the toothed wheel over the cam 35 for the picking up position, it comes to bear on a cam 37 for the closing position. The claws 47 are then in their closing position shown in FIGURE 14.

In order that the control plate 26 or the claw-actuating plate 27 do not drop downwards under the force of gravity, each of them is provided with a compensating spring 38, the other end of which is connected to an associated endless chain 31. The force of a compensating spring 38 compensates, for example, the weight of the control plate 26, four toothed wheels 29, a chain 31, two chain wheels and the control lever 32.

The device is further so designed that a support for a working plate and a baking tray arranged below the holding devices and the holding devices are together displaceable relatively to one another in a horizontal direction. To this end the support plate 16 is, as shown in FIGURES 3 and 5, guided on opposite edges of pairs of rollers 39 on two beams 40 arranged horizontally at a distance from one another and is displaceable in a horizontal plane. The beams 40 are fixed on vertically arranged posts 24. In one position the support plate 16 together with the gripper arrangements 44, the guide means 57, the control means, etc. are located above the baking tray 62, and in the other above the working plate 45. The working plate 45 resting on a table 42 is movable up and down by means of a foot lever 41. By the foot lever the working plate 45 is moved upwards and the dough pieces 46 are thus pushed between the claws 47 which are in the picking up position. Advantageously the gripper arrangement 44 is not moved for this.

There will now be described how dough pieces 46 are transferred and re-arranged by the device from the working or molding position shown in FIGURE 1 on the working plate 45 to the baking formation shown in FIGURE 2 on the baking tray 62.

The working plate 45 is placed on the lowered table 42, as shown in FIGURE 3. Then, as shown in FIGURES 4 or 5, the working plate 45 is brought under the support plate 16. Then at the latest, the claw-actuating lever 33 is placed against the cam 35 for the picking up position, so that the claws are in their picking up position, shown in FIGURE 4. Thereupon the control lever 32 is swung into its working plate position shown in FIGURE 5, so that the gripper arrangements 44 are in their working plate position, shown in FIGURE 4.

Then the working plate 45 is raised by means of the foot lever 41, so that the dough pieces 46 are pushed between the claws 47 of the gripper arrangements 44, as shown in FIGURE 4. The claw-actuating lever 33 is then swung into its closing position shown in FIGURE 11, so that the claws 47 occupy their closing position shown in FIGURE 11. The working plate 45 is then lowered and the gripper arrangements 44 hold the dough pieces 46.

The baking tray 62 is then brought under the support plate 16 as shown in FIGURE 3. The control lever 32 is then swung into its baking position shown in FIGURE 3, so that the gripper arrangements 44 assume their baking position shown in FIGURE 3. The claw-actuating lever 33 is then placed against the cam 34 for the spread position, and the claws 47 move into the spread position shown in FIGURE 3. The dough pieces 46 drop on to the baking tray 62.

I claim:
1. A device for picking up and depositing kneaded dough pieces including a support holding means projecting from said support and disposed in inner and outer rows about a center with said holding means being capable of movement at a certain distance away from the center and back thereto, at least one individual guide lever pivotally connected at one end to said support and operably related at the opposite end to the holding means, at least one control rod operably related to said holding means and reciprocable in the direction of its longitudinal axis between two positions for pivoting the holding means so that movement of the control rod into one position pivots all of the holding means inwardly towards the center whereby each two neighboring holding means are located closely together while movement of the control rod into the other position pivots all of the holding means away from the center whereby each two neighboring holding means are farther apart than in said one position, the improvement comprising said guide levers being of different lengths, a control stop on each guide lever close to fulcrum position thereof, said control stops being so moved by the control rod that the guide levers together with the holding means pivot about the fulcrum position, a thrust piece for each control stop, and a thrust piece for the control rod against which the thrust piece for the control stop bears when the holding means movable by such stop is pivoted out of said one position into said other position, the holding means in the outer row being movable with the degree of delay at the starting and ending of their movements relative to the holding means of the inner row and the thrust pieces for the control stops of the holding means of the inner row being disposed at an interval from the thrust piece for the control rod when the holding means are in said one position.

2. The device for picking up and depositing kneaded dough pieces as claimed in claim 1 in which the opposite end of each guide lever is pivotally connected to each holding means, a wheeled carriage on which each holding means is mounted and a guide plate on which said carriage runs whereby the holding means can be displaced parallel to its own direction of orientation.

3. The device for picking up and depositing kneaded dough pieces as claimed in claim 1, said support including a plate, a top parallelogram link releasably secured to said plate and each holding means being pivotally attached to two of said guide levers arranged in mutually parallel relationship and pivotally coupled to said top parallelogram link.

4. The device for picking up and depositing kneaded dough pieces as claimed in claim 1 in which the movement of a holding means in one direction is at least in part effected against the action of a return spring and the movement in the opposite direction effected partly by the action of the return spring.

5. The device for picking up and depositing kneaded dough pieces as claimed in claim 1 in which each holding means is provided with a suction device and a pressure generator for each suction device operably connected with the suction device.

6. The device for picking up and depositing kneaded dough pieces as claimed in claim 5 in which each pressure generator comprises a bellow-like hollow member, a stationary pressure plate and a pressure plate parallel to the stationary pressure plate between which said bellow-like hollow member is positioned, and said parallel pressure plate being movable perpendicularly with respect to the stationary pressure plate.

7. The device for picking up and depositing kneaded dough pieces as claimed in claim 5 in which each suction device includes a semi-spherical cup provided with a suction bore and a cup-shaped screen positioned in said semi-spherical cup.

8. The device for picking up and depositing kneaded dough pieces as claimed in claim 1 in which the holding means comprises a gripper having at least two claws arranged in spaced apart relation and capable of moving together and apart, each claw being attached to one arm of a bell crank lever having a fulcrum at its angle, and the other arm of said bell crank lever being pivotal by a claw rod slidable in its longitudinal direction and said rod being attached to the other arm of all of the claws.

9. The device for picking up and depositing kneaded dough pieces as claimed in claim 8 in which each claw is provided with a coating constituting the contact surface for a dough piece.

10. The device for picking up and depositing kneaded dough pieces as claimed in claim 8 including a reciprocating claw actuating plate operable upon several claw rods arranged on the side of the support remote from the grippers, said support being provided with slots for the passage of the claw rods and the size and direction of the slots corresponding substantially to the movements of the grippers parallel to the support.

11. The device for picking up and depositing kneaded dough pieces as claimed in claim 10 in which the claws are urged into the closing position by a claw closing spring with the forces of a return spring pulling the grippers into said one position.

12. The device for picking up and depositing kneaded dough pieces as claimed in claim 1 including a support means for a working plate and a baking tray located below said holding means, and said holding means being displaceable together relatively to one another in a horizontal direction.

13. The device for picking up and depositing kneaded dough pieces as claimed in claim 12 wherein actuating means for the control rod includes a plate movable by means of a toothed wheel meshing with a toothed rack fixed to the support, and a lever rigidly fixed to the wheel.

14. The device for picking up and depositing kneaded dough pieces as claimed in claim 11 including a guide means provided with a cross bar having a bore in which a part of each gripper carrying the claws is inserted in an axial rotatable manner.

References Cited

UNITED STATES PATENTS

| 2,903,290 | 9/1959 | Morris et al. | 214—1 |
| 3,106,048 | 10/1963 | Marasso et al. | 214—309 |
| 3,318,068 | 5/1967 | Voullaire. | |

GERALD M. FORLENZA, *Primary Examiner.*

GEORGE F. ABRAHAM, *Assistant Examiner.*

U.S. Cl. X.R.

294—87